No. 870,395. PATENTED NOV. 5, 1907.
W. J. TEESE.
APPARATUS USED FOR MILKING COWS.
APPLICATION FILED APR. 19, 1907.
2 SHEETS—SHEET 2.
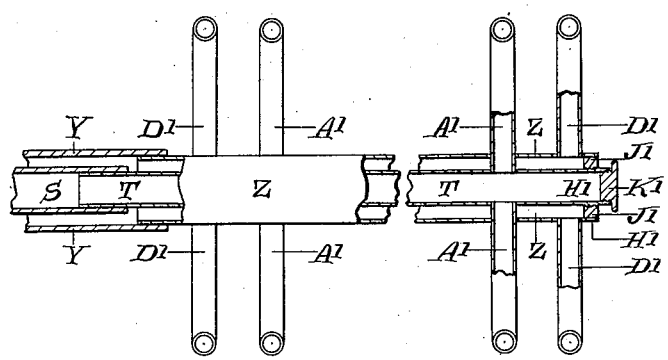
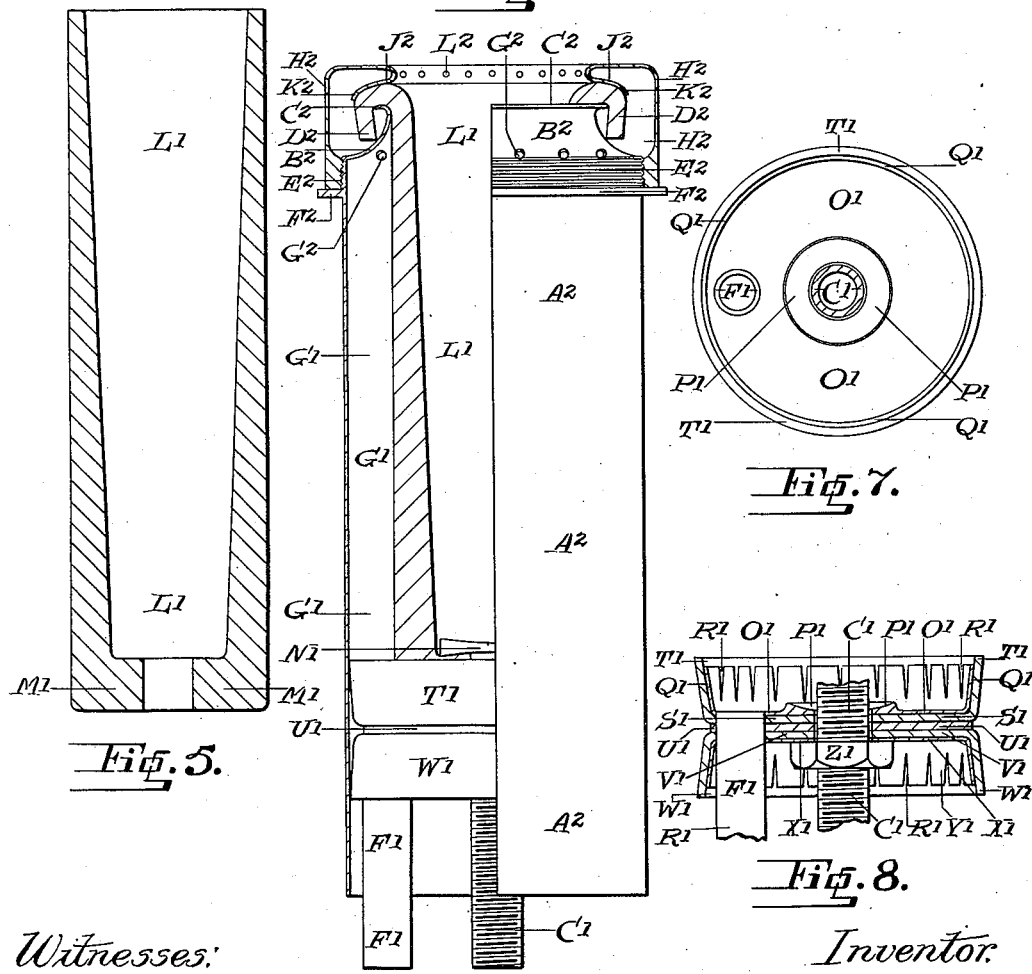
Witnesses:
A. B. Davis
Chas. H. Buell
Inventor
William John Teese.
By Dyrenforth, Lee, Chritton & Wiles,
Attys.

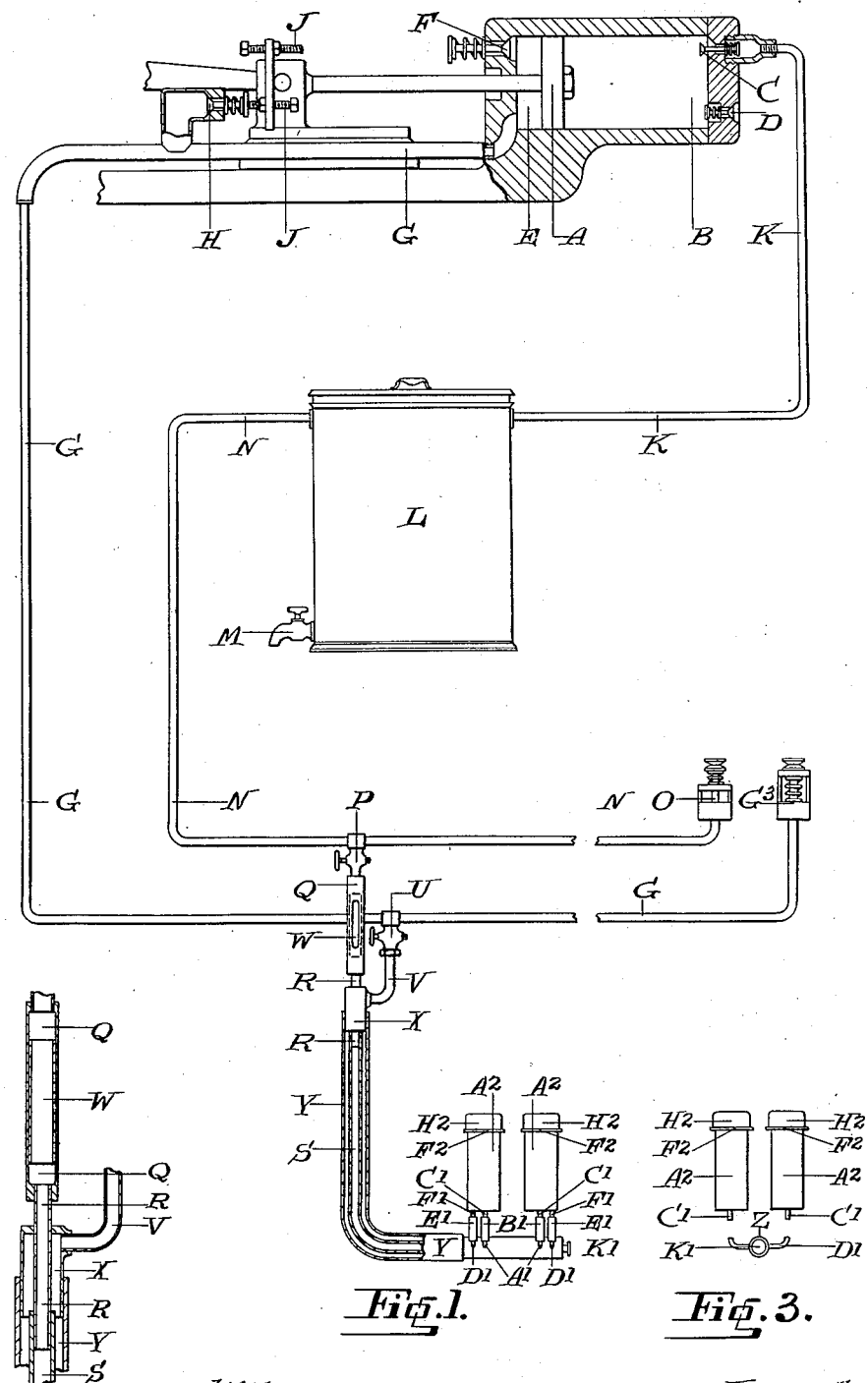

UNITED STATES PATENT OFFICE.

WILLIAM JOHN TEESE, OF BALACLAVA, VICTORIA, AUSTRALIA, ASSIGNOR TO WILLIAM HENRY BLACKHAM, OF MELBOURNE, AUSTRALIA.

APPARATUS USED FOR MILKING COWS.

No. 870,395.　　　　Specification of Letters Patent.　　　　Patented Nov. 5, 1907.

Application filed April 19, 1907. Serial No. 369,084.

*To all whom it may concern:*

Be it known that I, WILLIAM JOHN TEESE, a subject of the King of Great Britain and Ireland, residing at 80 William street, Balaclava, in the county of Bourke, State of Victoria, and Commonwealth of Australia, engineer, have invented certain new and useful Improvements in the Apparatus Used for Milking Cows, of which the following is a specification.

The object of my invention is to provide an apparatus which will milk cows both gently and efficiently. It includes a teat cup influenced by a vacuum in its interior, and four cycles around its exterior (partial vacuum, atmospheric pressure, compressed air and atmospheric pressure). In addition to the contracting and expanding movement the said teat cup is elongated by a downward movement communicated by a piston secured to its bottom. A reciprocating pump is also employed by which a vacuum is formed inside the teat cup. By the same pump with the assistance of its mechanically operated valves the four cycles before alluded to are formed outside the teat cup. A maximum vacuum and a maximum pressure, by reason of suitable valves in my pipe lines cannot be exceeded. Leading from the pipe lines to each cow is a milk and vacuum pipe inside a compressed air and vacuum pipe. Special udder piping of a like character is also used.

Referring to the drawings which form a part of this specification—Figure 1 represents an elevation partly in section of my apparatus showing a pump, a milk and vacuum reservoir, pipe lines, and branch pipes, valves, etc., and two teat cups. The relative position of the parts can be altered. They are arranged for convenience of illustration. Fig. 2 is a sectional view on an enlarged scale of portion of the piping. This connects the milk and vacuum pipe line and the compressed air and vacuum pipe line with a set of teat cups. Fig. 3 is an end elevation of the udder piping and teat cups. The flexible tubular connections between the udder piping and teat cups are removed. Fig. 4 is a plan on an enlarged scale of the under piping partly in section. Fig. 5 is a section of my teat cup on an enlarged scale before the cylindrical casing and other parts are applied and its top edge is folded downwardly. Fig. 6 is a side elevation on an enlarged scale and partly in section of my teat cup and its accompaniments. Fig. 7 is a plan of the teat cup piston. Fig. 8 is a sectional elevation of the teat cup piston.

Similar letters of reference indicate similar or corresponding parts where they occur in the several views.

My invention includes a reciprocating pump (Fig. 1) in which is a pump piston A. One end of the pump, the vacuum end B, is used for producing vacuum. It has an inlet valve C and an outlet valve D. The other end of the pump, the compression end E, has an inlet valve F controlled by a powerful spring. Upon the compressed air and vacuum pipe line G or connected in any suitable way to the compression end E of the cylinder of the pump is a relief valve H. Attached to the cross head or any suitable reciprocating part are tappets J. These are adjustable longitudinally and by them the inlet valve F and the relief valve H are mechanically opened at predetermined times.

From the vacuum end B of the pump and communicating with the inlet valve C is the milk and vacuum pipe K. This passes to and enters the top of a milk and vacuum reservoir L, in the top of which is a vacuum. From this reservoir the milk is discharged as desired by a draw off cock or tap M. From the top of the reservoir passes the milk and vacuum pipe line N. On the outer end of this milk and vacuum pipe line N or in any suitable position thereon are one or more vacuum regulating valves O. These valves may be of any suitable construction but are so designed that when a predetermined vacuum is reached air enters the milk and vacuum pipe line N. To the said milk and vacuum pipe line N (Fig. 1) and near each cow stall, is attached a cock P. To the lower end of this cock is attached the upper portion of an intermediate pipe Q. Inside this intermediate pipe is placed a glass tube W. A window is cut in the intermediate pipe Q whereby the flow of milk to the reservoir L can be perceived. The lower end of the intermediate pipe Q communicates with the upper end of an inner pipe R. To the lower end of the said inner pipe R is attached the upper end of an internal flexible milk and vacuum pipe S. The lower end of the internal flexible milk and vacuum pipe S is attached to the internal milk and vacuum udder pipe T hereinafter referred to and seen in Fig. 4.

From the compression end E of the pump passes the compressed air and vacuum pipe line G. On the outer end of this compressed air and vacuum pipe line G or in any suitable position thereon are one or more pressure regulating valves $G^3$. These valves may be of any suitable construction but are so designed that when a predetermined pressure is reached compressed air escapes from the compressed air and vacuum pipe line G. To the said compressed air and vacuum pipe line G and near each cow stall, is a cock U (see Fig. 1). To this cock is attached the top end of an intermediate pipe V (Figs. 1 and 2). The lower end of the said intermediate pipe V is attached to an outer pipe X. The said outer pipe X passes around the inner pipe R before referred to and is shorter than the same. To the lower end of the outer pipe X is attached the upper end of an external flexible compressed air and vacuum pipe Y. The lower end of the said pipe Y is attached to the external compressed air and vacuum udder pipe Z.

Passing from the internal milk and vacuum udder pipe T (Fig. 4) and through the external compressed air and vacuum udder pipe Z are the lower ends of milk and vacuum branches A¹. The said lower ends may be jointed to the internal and external pipes by solder or any other means. To the top ends of the milk and vacuum branches A¹ (Fig. 1) are attached the lower ends of flexible tubular connections B¹. The upper ends of the said flexible tubular connections are attached to the milk discharge tubes C¹ hereinafter referred to.

Passing into and communicating with the external compressed air and vacuum udder pipe Z are the lower ends of compressed air and vacuum branches D¹. (Figs. 1, 3 and 4). The upper ends of these branches (Fig. 1) have attached thereto the lower ends of flexible tubular connections E¹. Each upper end of the said flexible tubular connections E¹ is attached to the lower end of a compressed air and vacuum tube F¹. The upper end of this communicates with an annular chamber G¹ around the teat cup hereinafter described.

The end H¹ of the udder piping (Fig. 4) has between its external pipe Z and internal pipe T an annular plug ring J¹. In the internal milk and vacuum udder pipe T is a removable inspection and cleansing plug K¹.

On reference to Figs. 5 and 6 and also to Figs. 7 and 8 it will be seen that L¹ is a teat cup. This is preferably made of rubber or any other suitable flexible material or combination of materials. The upper end of this teat cup is open. Its wall in section preferably converges at the top. The bottom M¹ is closed, save for a hole for a milk discharge tube C¹ to pass through. The top end of the said milk discharge tube C¹ has a flange N¹ thereon. The underneath portion of this flange is concave. By the concavity the rubber is prevented from spreading when the flange is drawn onto the bottom M¹ of the teat cup. Beneath the said bottom M¹ is placed (Figs. 7 and 8) an upper disk O¹. This has a concave area P¹ in its middle. The outer edge of the said upper disk has an upturned portion Q¹. Interruptions R¹ are formed in the said upturned portion. Beneath the upper disk is placed an upper cup leather S¹. This has an upturned edge T¹. Beneath the said upper cup leather is an intermediate disk U¹. Beneath the said intermediate disk is situated a lower cup leather V¹. This has a down turned edge W¹. Beneath the said lower cup leather is placed a lower disk X¹. This has a downturned edge Y¹. Interruptions R¹ are formed in the said downturned edge. Beneath the lower disk X¹ is a nut Z¹ which threads upon a thread upon the milk discharge tube C¹. The above forms my teat cup piston. Through the lower disk X¹, the lower cup leather V¹, the intermediate disk U¹, the upper cup leather S¹, and the upper disk O¹ passes the upper end of a compressed air and vacuum tube F¹ (see Figs. 6, 7 and 8). The top end of this tube is soldered or otherwise attached to the upper disk O¹. Around the outside of the aforesaid teat cup L¹ and teat cup piston is a cylindrical casing A². The piston enters through the open bottom of the said cylindrical casing. The top of the said cylindrical casing (Fig. 6) is reduced in diameter forming a neck B², having an overturned edge C². The top end of the teat cup L¹ is folded outwardly over the top of the said neck forming a fold D². Below the neck and outside the cylindrical casing is a thread E². Below the thread may be a shoulder F². Through the said neck of the cylindrical casing A² are air passages G². Passing around the outside and over the top of the said cylindrical casing is an udder ring H². This is preferably of metal and is threaded on its bottom inside. It engages with the thread E² before referred to below the neck of the cylindrical casing. The upper inside portion of the udder ring H² is inwardly and backwardly folded as at J². The outer extremity of the folded portion J² is turned down as at K². Through the said udder ring and in any suitable position are air outlet holes L². The inwardly and backwardly folded portion J² of the said udder ring presses upon the overturned edge of the teat cup.

I do not wish to be understood as limiting myself to the exact details of construction and arrangement described since various slight and immaterial modifications may be made therein without departing from the spirit and the scope of my invention.

The cycle of operation with my invention is as follows:—Tracing the vacuum from the vacuum end B of the pump it passes through vacuum pipe K, through a milk and vacuum reservoir L, through a milk and vacuum pipe line N, through a cock P, an intermediate pipe Q, a glass tube W, an inner pipe R, an internal flexible milk and vacuum pipe S, an internal milk and vacuum udder pipe T, milk and vacuum branches A¹, flexible tubular connections B¹, a milk discharge tube C¹ to the interior of the teat cup L¹ which it retains to the animal. A continuous vacuum is maintained in the teat cup L¹. Tracing now the passage of the milk from the cow, we find that it enters the teat cup L¹, passes down the milk discharge tube C¹, through the flexible tubular connections B¹, to the milk and vacuum branches A¹, then through the internal milk and vacuum udder pipe T, through the internal flexible milk and vacuum pipe S, through the inner pipe R, through the intermediate pipe Q, the glass tube W (in which a stoppage of the flow is visible) past the cock P through the milk and vacuum pipe line N and into the milk and vacuum reservoir L. From this milk and vacuum reservoir the milk may be drawn off at M. Tracing now the compressed air and vacuum from the compression end E of the pump we find that it passes through the compressed air and vacuum pipe line G, through a cock U, an intermediate pipe V, an outer pipe X, an external flexible compressed air and vacuum pipe Y, an external compressed air and vacuum udder pipe Z compressed air and vacuum branches D¹, flexible tubular connections E¹ a compressed air and vacuum tube F¹ to an annular chamber G¹. In the annular chamber G¹ the cycle of pressure is as follows: On the pump piston commencing its inward stroke a partial vacuum is created in the annular chamber G¹. This reaches its maximum just as a tappet J strikes the inlet valve F. Atmospheric air then enters the pump cylinder, the compressed air and vacuum pipe line G and the annular chamber G¹ around the teat cup. The air continues to enter until the piston terminates its inward stroke and commences its outward stroke. With the outward stroke compression of the air continues until a tappet J strikes and opens the relief valve H which allows the compressed air to escape. When the compressed air escapes an atmospheric pressure once more reigns within the compressed air and vacuum pipe line G and the annular chamber G¹. Should the pressure in the compressed air and vacuum pipe line G exceed what is desired the pressure regulating valve G³ opens and the overcharge of compressed air escapes. Should the vacuum in the milk and vacuum pipe line N exceed the normal the vacuum regulating valve O opens and air is admitted.

Having now described my invention, what I claim as new and desire to secure by Letters Patent is:—

1. In the apparatus used for milking cows a reciprocating-pump cylinder having an inlet valve and a relief valve, said inlet valve being closed by a spring and opened by an adjustable tappet, said relief valve being closed by a spring and opened by an adjustable tappet, said tappets being reciprocated by the pump, all as and for the purposes hereinbefore described or as illustrated in the drawings.

2. In an apparatus for milking cows, a reciprocating-pump cylinder in one end of which a vacuum is formed and in the other end of which compressed air is formed, an inlet valve upon the compressed air end of the cylinder, a relief valve, and adjustable tappets actuated by said pump for opening said valves, for the purpose set forth.

3. In the apparatus used for milking cows a milk and vacuum pipe line having a cock thereon, an intermediate pipe communicating with said cock in which intermediate pipe is a glass tube, said intermediate pipe communicating with an inner pipe inside an outer pipe, said outer pipe being closed at its top upon said inner pipe in combination with a compressed air and vacuum pipe line having a cock thereon, an intermediate pipe attached to said cock, said intermediate pipe communicating with the outer pipe, all as and for the purposes hereinbefore described or as illustrated in the drawings.

4. In the apparatus used for milking cows an external compressed air and vacuum udder pipe inside which is an internal milk and vacuum udder pipe, a plug ring between the two said pipes, a removable inspection and cleansing plug in the internal pipe, milk and vacuum branches passing through the external pipe and into the internal pipe, compressed air and vacuum branches communicating with the external pipe, all as and for the purposes hereinbefore described or as illustrated in the drawings.

5. In the apparatus used for milking cows a teat cup the bottom end of which has attached thereto a piston, said piston moving within a cylindrical casing and consisting of an upper and a lower cup leather, an upper and a lower and an intermediate disk, said upper disk having a concave area in its middle, a milk discharge tube uniting the bottom of the teat cup and the piston, the top end of said milk discharge tube having a flange thereon, the underneath portion of said flange being concave, a compressed air and vacuum tube passing through said piston, all as and for the purposes hereinbefore described or as illustrated in the drawings.

6. In the apparatus used for milking cows, a reciprocating pump in one end of which a vacuum is formed, which vacuum is communicated to a milk and vacuum reservoir and to a milk and vacuum pipe line having a vacuum regulating valve thereon, in the other end of which reciprocating pump compressed air and partial vacuum are formed, an air inlet valve to said pump also a relief valve upon said pump or upon a compressed air and vacuum pipe line leading from said pump, said air inlet valve and relief valve being operated by tappets, a pressure regulating valve upon said compressed air and vacuum pipe line, all as and for the purposes hereinbefore described or as illustrated in the drawings.

7. In apparatus used for milking cows, a vacuum pipe communicating with the milk and vacuum reservoir, a milk and vacuum pipe line having a vacuum regulating valve thereon, a cock upon said milk and vacuum pipe line communicating with an intermediate pipe having a window cut therein inside which is a glass tube, said intermediate pipe communicating with an inner pipe, said inner pipe communicating with an internal flexible milk and vacuum pipe, in combination with the compressed air and vacuum pipe-line, containing a pressure-regulating valve, an outer pipe, an intermediate pipe connecting said air and vacuum pipe-line with said outer pipe, a cock in said last-named intermediate pipe, and an external flexible compressed air and vacuum pipe communicating with said pipe, for the purpose set forth.

8. In apparatus used for milking cows an external flexible compressed air and vacuum pipe the upper end of which is attached to an outer pipe and the lower end to an external compressed air and vacuum udder pipe, branches leading from the said udder pipe, flexible tubular connections on said branches, each connection leading to a compressed air and vacuum tube, a teat-cup, a piston beneath said cup, and to which the upper end of said compressed-air and vacuum-tube is connected, in combination with an internal flexible milk and vacuum pipe the upper end of which is attached to an inner pipe and the lower end of which is attached to an internal milk and vacuum udder pipe, the end of said internal milk and vacuum udder pipe having a removable inspection and cleansing plug therein, an annular plug ring between the ends of said inner and outer udder pipes, branches passing through the external compressed air and vacuum udder pipe and into the internal milk and vacuum udder pipe, flexible connections attached to said branches, each said connection being attached to a milk discharge tube, the upper end of which is attached to the bottom of said teat cup, all as and for the purposes hereinbefore described or as illustrated in the drawings.

9. In apparatus used for milking cows a cylindrical casing having a neck-portion with an overturned edge beyond said neck-portion, a teat-cup in said casing provided at its top with a flange fitting over the overturned edge of the casing, an udder ring having a turned down portion bearing against the flange of said teat-cup, the lower end of said cylindrical casing being open, a piston inside the lower end of said cylindrical casing, said piston being attached by a milk discharge tube to the bottom of the teat cup, a compressed air and vacuum tube passing through the said piston and communicating with an annular chamber between the said teat cup and the cylindrical casing, all as and for the purposes hereinbefore described or as illustrated in the drawings.

In testimony whereof I affix my signature in the presence of two subscribing witnesses.

WILLIAM JOHN TEESE.

Witnesses:
    CECIL W. LE PLASTRIER,
    GEORGE A. U'REN.